Figure 1:
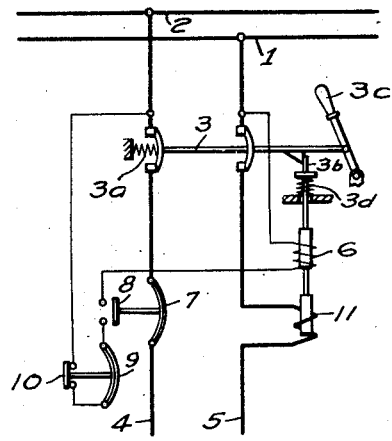

Dec. 3, 1940. A. KLEINDIENST ET AL 2,223,729

CIRCUIT INTERRUPTER

Filed July 20, 1938

WITNESSES:
E. A. McCloskey
Wm. C. Groome

INVENTORS
Albert Kleindienst and
Dietrich Müller-Hillebrandt
BY
Ralph H. Swingle
ATTORNEY Patented Dec. 3, 1940

2,223,729

UNITED STATES PATENT OFFICE 2,223,729

CIRCUIT INTERRUPTER

Albert Kleindienst, Berlin-Pankow, and Dietrich Muller - Hillebrandt, Berlin - Charlottenburg, Germany, assignors to Westinghouse Electric and Manufacturing Company, a corporation of Pennsylvania Application July 20, 1938, Serial No. 220,276
In Germany July 20, 1937

16 Claims. (Cl. 175—294)

This invention relates to circuit interrupters such as motor starters or circuit breakers of the type in which the device automatically opens the circuit to protect the electric apparatus controlled thereby against overloading. Such automatic circuit interrupters are provided with a current responsive device having a time delay which, for example, may be a bimetallic or other thermal element. If the circuit breaker is of the type having a shunt trip coil, the bimetallic element may have a contact which closes a tripping circuit to energize the shunt trip coil when the bimetallic element has been heated due to the flow of a predetermined overload current for a predetermined period of time.

In the usual circuit interrupters using a thermal overload device, it is impossible to reclose the interrupter by hand until after the thermal element has cooled down and returned to its normal position. For many applications it is desirable that the circuit breaker may be reclosed immediately after it has been tripped to the open position even though the bimetallic element has not cooled to the temperature which it has upon the flow of normal current, and has not bent back to the position which it must have to permit the circuit breaker to be latched in closed position.

It might appear at first that it is not desirable that it be possible to reclose a circuit breaker immediately after tripping, since a properly calibrated trip device would only cause opening of the circuit being protected when the apparatus connected thereto has reached a dangerous temperature. If the circuit breaker is immediately reclosable, the protection afforded by the overcurrent trip device may be lost if the circuit breaker is repeatedly reclosed. There are, however, cases in which it is absolutely essential that the circuit breaker shall be reclosable immediately or, at most, only several seconds after it has been tripped. For example, this is the case with motors for driving rayon spinning machines. It is particularly desirable that it be possible to immediately reclose the circuit breaker in cases where the overload may have ceased, or has decreased to the point where it is not dangerous, after the circuit has been once opened.

One object of the invention is to provide a circuit interrupter which may be immediately reclosed after being tripped to open the circuit, even though the trip element may still remain in tripping position.

Another object of the invention is to provide an automatic circuit interrupter of the type having a shunt trip coil and in which the circuit of the shunt trip coil is controlled by both a time delay overcurrent relay (for example a bimetallic relay) and by an additional overcurrent relay which may be of the solenoid type. This additional relay is operable after tripping of the circuit breaker by the time delay relay to open the trip circuit and nullify the effect of the time delay relay so that the circuit breaker may be reclosed immediately after it has been opened. When operating upon the occurrence of an overload, the bimetallic element of the time delay overcurrent relay is heated and after a certain time it closes its contact and energizes the shunt trip coil of the circuit breaker to release the circuit breaker latch and permit the circuit breaker to open the circuit. If the circuit breaker is reclosed and the current has dropped below a dangerous value, the contact of the second relay is opened to interrupt the circuit of the trip coil so that the circuit breaker may remain closed in spite of the fact that the contact of the bimetallic relay may still be closed.

A further object of the invention is to provide a circuit interrupter having a normally energized holding coil which causes opening of the circuit breaker upon deenergization of the circuit of the holding coil, with a time delay overcurrent relay for opening the holding circuit and a second contact connected in parallel with the time delay relay contact and operable to reclose the holding coil circuit, even though the overcurrent or bimetallic relay may remain in open position, to permit instantaneous reclosing of the circuit interrupter. Upon the occurrence of an overload, the time delay or bimetallic relay opens its contact after a predetermined time delay, such as may be required for the bimetallic strip to be heated up. This opens the circuit of the holding coil and the circuit interrupter moves to open position. If the circuit interrupter is immediately reclosed and if the current is no longer of a dangerous value, the contact of the second relay maintains the holding circuit closed so that the circuit interrupter may remain closed in spite of the fact that the bimetallic strip may not have cooled down.

A further object of the invention is to provide a circuit interrupter in which a first current responsive element trips the interrupter after a time delay upon the occurrence of a predetermined condition, but which may be immediately reclosed by a second current responsive element operable to permit the circuit interrupter to be latched in closed position irrespective of the position of the first current responsive element only when the current through the circuit interrupter is below a predetermined value.

A further object of the invention is to provide a circuit interrupter structure of low cost, in which a first bimetallic element is responsive to overcurrent to trip the interrupter and in which a second bimetallic element is operable to permit the circuit interrupter to be immediately reclosed after being tripped. This may be done by having the first bimetallic element close the circuit of a shunt trip coil upon the occurrence of an overload and by having the second bimetallic element operate very quickly (for example, in about three seconds) after the closing of the trip circuit to reopen the trip circuit. The second bimetallic element should have a time characteristic such that it will cool down only after a period of time which is longer than the time required for the first bimetallic element to be cooled after the disappearance of the overcurrent in the main circuit and to open its contact in the circuit of the trip coil.

These and other objects and advantages of the invention will be better understood from the following description of the modifications shown by way of example on the drawing, in which:

Figures 1 to 5 each show one modification of a circuit interrupter constructed according to the invention with its associated electrical circuits. The structures of the modifications illustrated have many parts which are the same and the same reference numerals have been used to indicate similar parts of each structure.

In each of the modifications illustrated, the automatic circuit breaker 3 connects a line comprising conductors 1 and 2 to a load by means of conductors 4 and 5. In each case, the circuit breaker 3 is biased to move to the open position by a spring 3a and is held closed by a latch 3b. The circuit breaker is shown as operable by a handle 3c. While the circuit breaker 3 has been shown schematically as having its contacts directly connected to the handle 3c, it is understood that the circuit interrupter may be of the well known trip-free type, in which a trip-free mechanism between the handle and the contacts permits the contacts to be tripped and to move to open circuit position irrespective of the position in which the handle may be held. Such mechanisms are well known and reference is given by way of example to one such device shown in H. D. Dorfman Patent No. 1,966,286, issued July 10, 1934, to the assignee of this invention. The circuit breaker mechanism of the Dorfman patent may be used according to this invention by having the latch arm on the end of the cradle shown in the patent normally held by the latch 3b instead of by the cam elements directly retained by the bimetallic elements as shown in the patent.

Figure 2:
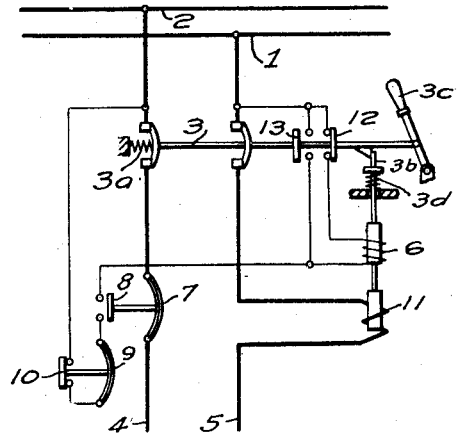
Figure 3:
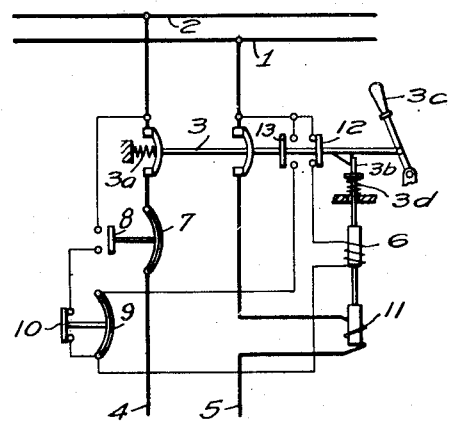

The circuit breaker 3 is provided with a trip coil 6 which may be energized from the main line. As shown in Figs. 1, 2 and 3, a bimetallic or other electro-responsive time delay relay 7 is connected in the main circuit through the circuit interrupter so as to be responsive to the current flow therethrough. While the bimetallic element is shown as being directly traversed by the main current, it is understood that, if desired, the bimetallic element may be heated by a heating coil connected in the main circuit as is well known. The time delay relay 7 has a control contact 8 operable to close the tripping circuit of the trip coil 6. There is connected in the trip circuit a second bimetallic or other electro-responsive time delay relay 9 having a second control contact 10 in series with the contact 8.

As shown in Figs. 1 and 2, the relay 9 is heated by the current flow through the trip circuit when it is energized by closing of the contact 8 and is designed to heat up quickly (for example, in about three seconds) to open its contact 10 almost immediately after the contact 8 is closed. The bimetallic element 9 is designed so that it will cool down and reclose the contact 10 only after the bimetallic element 7 has cooled down and opened its contact 8.

In each modification, the circuit interrupter is also provided with a magnetic trip coil 11 which will open the circuit substantially instantaneously upon the occurrence of a heavy short circuit (for example, 8 to 10 times full load current) without the time delay required for tripping of the circuit breaker through the time delay or bimetallic relay 7 which is designed to cause opening of the circuit breaker upon the occurrence of small overloads which exist for a predetermined period of time.

The operation of the circuit interrupter of the modification of this invention shown in Figure 1 is as follows: The drawing shows the circuit interrupter 3 in its closed position with the load conductors 4 and 5 connected to the lines 1 and 2 with normal current flowing in the circuit. Upon the occurrence of a predetermined overload which has existed for a predetermined period of time, the bimetallic element 7 is heated and closes its contact 8 to energize the tripping circuit through the circuit extending from line 2, to contact 10, bimetal 9 and contact 8 through the trip coil 6 to line 1. This pulls down the latch 3b against the bias of its spring 3d and permits the circuit breaker 3 to be moved to open position by its biasing spring 3a.

The closing of control contact 8 by the bimetallic element 7 causes the bimetallic element 9 to be heated and to quickly open its contact 10 (in approximately three seconds). The opening of the contact 10 deenergizes the trip coil 6. As a result, it is possible, after this short time, to reclose the circuit interrupter 3 and have it latched in closed position by the latch 3b, even though the time delay relay 7 has not returned to its normal position due to it still being hot if it is a thermal device. The bimetallic element 9 has a time delay in reclosing its control contact 10, since it must cool down; and it is designed to not reclose the contact 10 until after the time delay relay 7 has moved its contact to the open position. If, when the circuit breaker 3 is reclosed after tripping, the condition causing the overcurrent has been remedied, the relays 7 and 9 will return to the normal position shown on the drawing with the trip coil 6 deenergized and the circuit breaker 3 will remain closed.

In Fig. 2 is shown another embodiment of the invention, and since most of the parts are the same as described in Fig. 1, only those features which are different will be described in detail. The circuit interrupter 3 is mechanically connected to operate two auxiliary contacts 12 and 13 upon each movement of the circuit interrupter. The auxiliary contact 13 is connected to short circuit the trip circuit around the trip coil 6 when the trip coil 6 is disconnected from the tripping circuit by the contact 12 as the circuit breaker 3 moves to open position.

Upon the occurrence of an overload which exists for a predetermined time, the time delay or bimetallic relay 7 closes its contact 8 which energizes the trip circuit which extends from the line 2 through the contact 10, relay 9, contact 8, trip coil 6, and auxiliary contact 12 to the line 1. This causes the circuit interrupter 3 to be released and upon moving to open position, the auxiliary contact 12 disconnects the trip coil 6 from the tripping circuit and the auxiliary contact 13 recloses the circuit through the bimetallic element 9 around the coil 6 and contact 12 so that current will continue to flow and heat the bimetallic element 9 and cause it to open its contact 10 in two or three seconds and permit the circuit breaker 3 to be reclosed substantially immediately. If, upon reclosing of the circuit breaker, the cause of the overcurrent no longer exists, the bimetallic element 7 will cool down and open its contact 8 (which may take 60 seconds or more) and then the bimetallic element 9 will cool down to the point where it closes its contact 10.

The modification shown in Fig. 3 differs from the embodiment of Fig. 2 only in that the second bimetallic element 9 is not heated by the current which flows through the trip coil 6, but is connected in the circuit only upon closing of the auxiliary contact 13 upon opening of the circuit interrupter 3. The trip circuit which is energized upon the occurrence of an overload is from line 2 through contacts 8 and 10 directly to trip coil 6 and auxiliary contact 12 to line 1 without passing through the operating element of relay 9. Upon opening of the circuit interrupter 3, the auxiliary contact 12 opens the circuit through trip coil 6 and auxiliary contact 13 closes a circuit from line 2 through contacts 8 and 10, bimetallic element 9 and contact 13 to line 1. Operation of the embodiment of Fig. 3 is otherwise the same as in Fig. 2.

Figure 4:
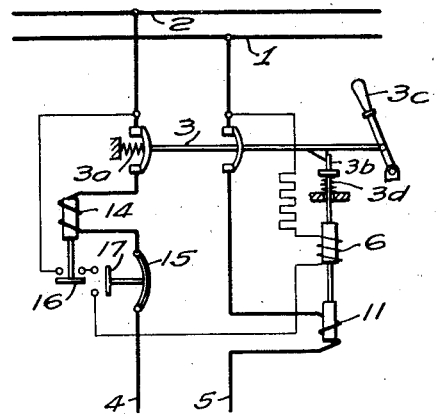

In the modification shown in Fig. 4, the current responsive means for causing tripping of the circuit breaker 3 comprises a magnetic solenoid or other substantially instantaneous electro-responsive trip device 14 and a time delay or bimetallic trip element 15 connected in series in the main circuit through the circuit interrupter 3. The contacts 16 and 17 of the trip devices 14 and 15 are connected in series in the trip circuit of the trip coil 6.

The circuit interrupter of Fig. 4 operates upon the occurrence of a predetermined overload by the relay 14 first closing its contact 16, but this does not energize the trip coil since the trip circuit is still open at the contact 17. If the overload condition exists for a predetermined time, the time delay or bimetallic element 15 will be actuated to close its contact 17 and thus energize the trip coil 6 to release the latch 3b and cause the circuit breaker 3 to move to open circuit position due to the bias of its opening spring 3a. Immediately upon opening of the circuit breaker, the main circuit is deenergized and the relay 14 will cause its contact 16 to open the tripping circuit instantaneously. This deenergizes the trip coil 6 so that the circuit interrupter 3 may be immediately reclosed and if the cause of the overcurrent no longer exists, the circuit breaker 3 will be relatched at 3b and remain in closed position even though the time delay or bimetallic element 15 has not returned to its normal or cool position. If the overload condition should still exist when the circuit breaker 3 is reclosed, the relay 14 will close its contacts 16 and where the bimetallic element 15 has not cooled down, its contact 17 will already be closed and the circuit breaker will move again immediately to open position. The relay 14 may be calibrated for some current greater than full load current (such, for example, as 1.2 times full load current) so that it will be possible to immediately reclose the circuit breaker after tripping even if a small overload still exists.

Figure 5:
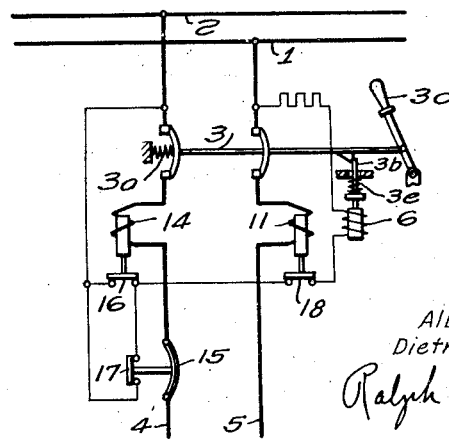

In each of the embodiments described heretofore, the release of the circuit interrupter 3 has been by means of a shunt trip coil which operates upon energization thereof. Without deviating from the essence of the invention, a circuit interrupter may be used which is biased to open position and has holding means for retaining it in closed position which is normally energized and which trips the circuit breaker upon being deenergized. An example of this type of structure is shown in Fig. 5, where the circuit breaker 3, which is biased to open position by spring 3a, is retained closed by holding means comprising a latch 3b which instead of being biased into latched position as in the structures described heretofore, is biased by a spring 3e to move to open position. The latch 3b is normally held in latched position by the holding coil 6 which is normally energized. In this case the contacts 16 and 17 of the electro-responsive devices 14 and 15 are connected in parallel in the tripping circuit and are both normally maintained in closed position. The heavy short circuit trip coil 11 actuates a contact 18 connected in series with both of the contacts 16 and 17. Current normally flows in the trip circuit to keep the coil 6 energized from line 2 through either contact 16 or 17 if either contact is closed, contact 18 and holding coil 6, to the line 1.

The structure of Fig. 5 operates upon the occurrence of an overload current to first open the contact 16, but this does not deenergize the tripping circuit since this circuit is still completed through the contact 17 in parallel therewith. When the overload has persisted for a predetermined time, the bimetal 15 will be heated to the point where it opens the contact 17. This breaks the tripping circuit and deenergizes the holding coil 6 to permit the latch 3b to be moved to unlatched position by its spring 3e and the circuit breaker 3 is moved to open position by its spring 3a. The opening of the circuit breaker 3 deenergizes the current responsive device 14 and permits its contact 16 to reclose the tripping circuit. This reenergizes the coil 6 and permits the circuit breaker 3 to be reclosed and to be retained in closed position by the latch 3b even though the time delay tripping means 15 has not yet returned to closed position.

If the cause of the overload condition has not been remedied when the circuit breaker 3 is reclosed, the current responsive device 14 will again be energized to open its contacts 16 and deenergize the holding coil 6 to cause the circuit breaker to reopen. It is thus seen that while the circuit breaker can be immediately reclosed after tripping, it cannot be maintained closed if the predetermined overload condition persists. The current responsive device 11 operates in response to the occurrence of a heavy short circuit as in the modifications previously described to trip the breaker without time delay. In this case, tripping of the breaker is accomplished by opening of the contact 18, thereby deenergizing the holding coil 6 to allow the latch 3b to release the circuit breaker 3.

While several embodiments of the invention have been shown and described, it is understood that other modifications may be made and that the modifications shown are only for purpose of illustration and that the invention is not to be limited except as set forth in the appended claims.

We claim as our invention:

1. In a circuit interrupter, contact means, operating means for causing said contact means to open and close the circuit, said operating means including an electro-responsive member actuable to cause the operating means to actuate said contact means to open the circuit, and said operating means including means for thereafter making said contact means remain in position to close the circuit, when returned to that position, for at least a short period of time even though said electro-responsive member may still be acting to cause opening of the circuit.

2. In a circuit interrupter, contact means for opening and closing the circuit, electro-responsive means movable from a normal to an actuated position to initiate actuation of said contact means to open the circuit, and means operable to nullify the effect of said electro-responsive means on said contact means during the period that said electro-responsive means remains in said actuated position after having once initiated actuation of said contact means to open the circuit so that said contact means may be operated to reclose the circuit before said electro-responsive means returns to said normal position.

3. In a circuit controlling device, contact means movable from a closed circuit position to an open circuit position, holding means for retaining said contact means in closed circuit position including a member movable to a tripping position upon the occurrence of a predetermined condition to initiate actuation of said contact means to open circuit position and a member movable to a position where it is effective after said contact means has moved to open circuit position and has been returned to closed circuit position to cause said holding means to retain said contact means in closed circuit position even though the first said member may still be in tripping position.

4. In a circuit controlling device, contact means movable from a closed circuit position to an open circuit position, holding means for retaining said contact means in closed circuit position including a member movable to a tripping position upon the occurrence of a predetermined condition to initiate actuation of said contact means to open circuit position and a member movable to a position where it is effective after said contact means has moved to open circuit position and has been returned to closed circuit position to cause said holding means to retain said contact means in closed circuit position even though the first said member may still be in tripping position, and means for causing said holding means to release said contact means to move to open circuit position if there exists a predetermined condition when said contact means are reclosed.

5. In a circuit interrupter, contact means for opening and closing the circuit, thermally responsive means heated upon the occurrence of a predetermined condition in the circuit to cause said contact means to open the circuit, and means for thereafter causing said contact means, if returned to position to close the circuit, to remain in that position for the time required for said thermally responsive means to cool down to a point where it no longer acts to cause opening of the circuit at least if the cause of said predetermined condition has ceased to exist.

6. In a circuit controlling device, contact means movable from a closed circuit position to an open circuit position, holding means for retaining said contact means in closed circuit position including thermally responsive means heated by the current and movable to a tripping position upon the occurrence of a predetermined condition to permit said contact means to move to open circuit position, and a member movable to a position where it is effective, after said contact means has moved to open circuit position and has been returned to closed circuit position, to cause said contact means to be retained in closed circuit position at least if the cause of said predetermined condition has ceased to exist and even though said thermally responsive means has not cooled down and moved out of its tripping position.

7. In a circuit interrupter, main contact means for opening and closing the circuit, means for controlling said main contact means including a first control contact operable to initiate opening of said main contact means upon the occurrence of a predetermined condition and a second control contact operable after opening of said main contact means to nullify the effect of said first control contact and permit said main contact means to be reclosed substantially immediately after opening.

8. In a circuit interrupter, contact means for opening and closing the circuit, and thermal tripping means including a thermal element operable when heated to cause opening of said contact means, said thermal tripping means including means operating with a time delay characteristic for rendering the thermal element ineffective to cause a second opening of said contact means for a period of time required for the thermal element to cool down to the point where it does not tend to cause opening of said contact means.

9. In a circuit interrupter, contact means for opening and closing the circuit, a first thermal means operable when heated to cause opening of said contact means, a second thermal means operable quickly after the opening of said contact means to make possible a normal reclosing of said contact means even though said first thermal means may still be at a temperature to cause opening of said contact means.

10. In a circuit interrupter, main contact means, a releasing coil for said main contact means, thermal means operable when heated to energize said releasing coil to cause opening of said main contact means, an auxiliary contact operable to deenergize said releasing coil not later than shortly after opening of said main contact means, a time delay device for preventing a second energization of said releasing coil by said thermal means for the period required for said thermal means to cool down, and a second auxiliary contact operable to start said time delay device.

11. In a circuit interrupter, contact means for opening and closing the circuit, a pair of current responsive means each responsive to the current in the circuit of said contact means for causing opening of said contact means, one of said current responsive means being operable prior to the other current responsive means upon the occurrence of a predetermined condition but being ineffective to cause opening of the circuit until the operation of the other current responsive means, and the first said current responsive means being operable to permit the contact means to be reclosed prior to the return operation of the other current responsive means at least if there does not exist in the circuit a predetermined condition.

12. In a circuit interrupter, contact means for opening and closing the circuit, a first and a second current responsive means each operable upon the occurrence of a predetermined condition in the circuit of said contact means for causing opening of said contact means, the first of said current responsive means being operable more quickly than the second current responsive means upon the occurrence of a predetermined condition but being ineffective to cause opening of the circuit until the operation of the second of said current responsive means, the second of said current responsive means including thermal means operable only after the time delay required for heating thereof to cause opening of said contact means, and the first said current responsive means being operable after opening of said contact means to permit reclosing thereof prior to the cooling of said thermal means at least if there does not exist in the circuit a predetermined condition.

13. In a circuit interrupter, contact means for opening and closing the circuit, a normally energized holding circuit for retaining said contact means in closed position, current responsive means movable from a normal to an actuated position to cause opening of said holding circuit and release of said contact means, and means operable to reenergize said holding circuit after opening of said contact means even though said current responsive means may still be in actuated position.

14. In a circuit interrupter, contact means for opening and closing the circuit, a normally energized holding circuit for retaining said contact means in closed position, current responsive means movable from a normal to an actuated position to cause opening of said holding circuit and release of said contact means, and means operable to re-energize said holding circuit after opening of said contact means even though said current responsive means may still be in actuated position, said means to re-energize the holding circuit being ineffective to maintain the holding circuit energized upon the occurrence of a predetermined condition some time after said current responsive means has returned to normal position.

15. In a circuit interrupter, contact means for opening and closing the circuit, a normally energized holding circuit for retaining said contact means in closed position, thermal means heated in response to the current flow through said contact means and operable upon the occurrence of a predetermined current to cause opening of said holding circuit and release of said contact means, and means operable to re-energize said holding circuit prior to the cooling of said thermal means so that said contact means may reclose the circuit within a short time after being caused to open the circuit at least if the cause of said predetermined current has ceased to exist.

16. In a circuit interrupter, main contact means biased to move and open the main circuit, holding means including a normally energized coil for retaining said main contact means in closed position, thermal means heated in response to current flow in the main circuit, a first control contact actuated by said thermal means upon the occurrence of a predetermined condition in the main circuit to deenergize said coil and release said main contact means to move to open position due to its bias, and a second control contact connected in parallel with said first control contact and operable to re-energize said coil at least during the period when said first control contact is actuated by said thermal means to deenergize said coil and at least if said predetermined condition has ceased to exist in the main circuit.

DIETRICH MULLER-HILLEBRANDT.
ALBERT KLEINDIENST.